US010329886B2

(12) United States Patent
Steele et al.

(10) Patent No.: US 10,329,886 B2
(45) Date of Patent: Jun. 25, 2019

(54) ROD PUMP SYSTEM

(71) Applicant: RAISE PRODUCTION INC., Calgary (CA)

(72) Inventors: Geoff Steele, Calgary (CA); Eric Laing, Calgary (CA); Dan Stannus, Calgary (CA)

( * ) Notice: Subject to any disclaimer, the term of this patent is extended or adjusted under 35 U.S.C. 154(b) by 0 days.

(21) Appl. No.: 15/321,140

(22) PCT Filed: Jun. 25, 2015

(86) PCT No.: PCT/CA2015/050585
§ 371 (c)(1),
(2) Date: Dec. 21, 2016

(87) PCT Pub. No.: WO2015/196287
PCT Pub. Date: Dec. 30, 2015

(65) Prior Publication Data
US 2017/0191356 A1    Jul. 6, 2017

Related U.S. Application Data

(60) Provisional application No. 62/016,888, filed on Jun. 25, 2014.

(51) Int. Cl.
| E21B 43/12 | (2006.01) |
| E21B 43/38 | (2006.01) |
| E21B 34/00 | (2006.01) |
| E21B 43/16 | (2006.01) |
| F04B 47/00 | (2006.01) |
| F04B 53/10 | (2006.01) |

(Continued)

(52) U.S. Cl.
CPC ............ *E21B 43/126* (2013.01); *E21B 34/00* (2013.01); *E21B 34/08* (2013.01); *E21B 43/12* (2013.01); *E21B 43/16* (2013.01); *E21B 43/38* (2013.01); *F04B 19/22* (2013.01); *F04B 47/00* (2013.01); *F04B 53/10* (2013.01); *F16K 15/063* (2013.01)

(58) Field of Classification Search
CPC ........ E21B 43/126; E21B 43/38; E21B 34/08; F04B 19/22; F04B 47/00; F04B 53/10; F16K 15/063
See application file for complete search history.

(56) References Cited

U.S. PATENT DOCUMENTS

| 913,123 A | 2/1909 | Gleason |
| 1,066,798 A | 7/1913 | Conrader |
| (Continued) | | |

FOREIGN PATENT DOCUMENTS

| WO | 2013086623 | 6/2013 |

*Primary Examiner* — David J Bagnell
*Assistant Examiner* — Yanick A Akaragwe
(74) *Attorney, Agent, or Firm* — Bennett Jones LLP

(57) ABSTRACT

A rod pump system includes subsystems or components which are adapted to provide efficient operation when operating with produced fluids having high gas content or in highly deviated wellbores, or both. The subsystems or components include a traveling valve assembly, a sliding top valve assembly, an oil/gas separator, or a rod bushing and pump barrel assembly, or combinations of such subsystems or components. The rod pump system may be deployed in conjunction with conventional, unconventional or enhanced oil recovery techniques, such as steam-assisted gravity drainage, miscible flood, steam, gas or water injection.

14 Claims, 12 Drawing Sheets

(51) Int. Cl.
*F16K 15/06* (2006.01)
*E21B 34/08* (2006.01)
*F04B 19/22* (2006.01)

(56) References Cited

U.S. PATENT DOCUMENTS

| | | |
|---|---|---|
| 1,104,962 A | 7/1914 | Clark |
| 2,344,786 A | 3/1942 | Patterson et al. |
| 4,219,311 A | 8/1980 | Simon |
| 4,880,062 A * | 11/1989 | Bland .................... E21B 34/12 137/625.5 |
| 4,907,953 A | 3/1990 | Hebert et al. |
| 5,117,861 A | 6/1992 | McConnell et al. |
| 5,141,411 A | 8/1992 | Klaeger |
| 5,249,936 A | 10/1993 | McConnell et al. |
| 5,407,333 A | 4/1995 | Lambright |
| 5,829,952 A | 11/1998 | Shadden |
| 7,108,059 B1 | 9/2006 | Lanier |

\* cited by examiner

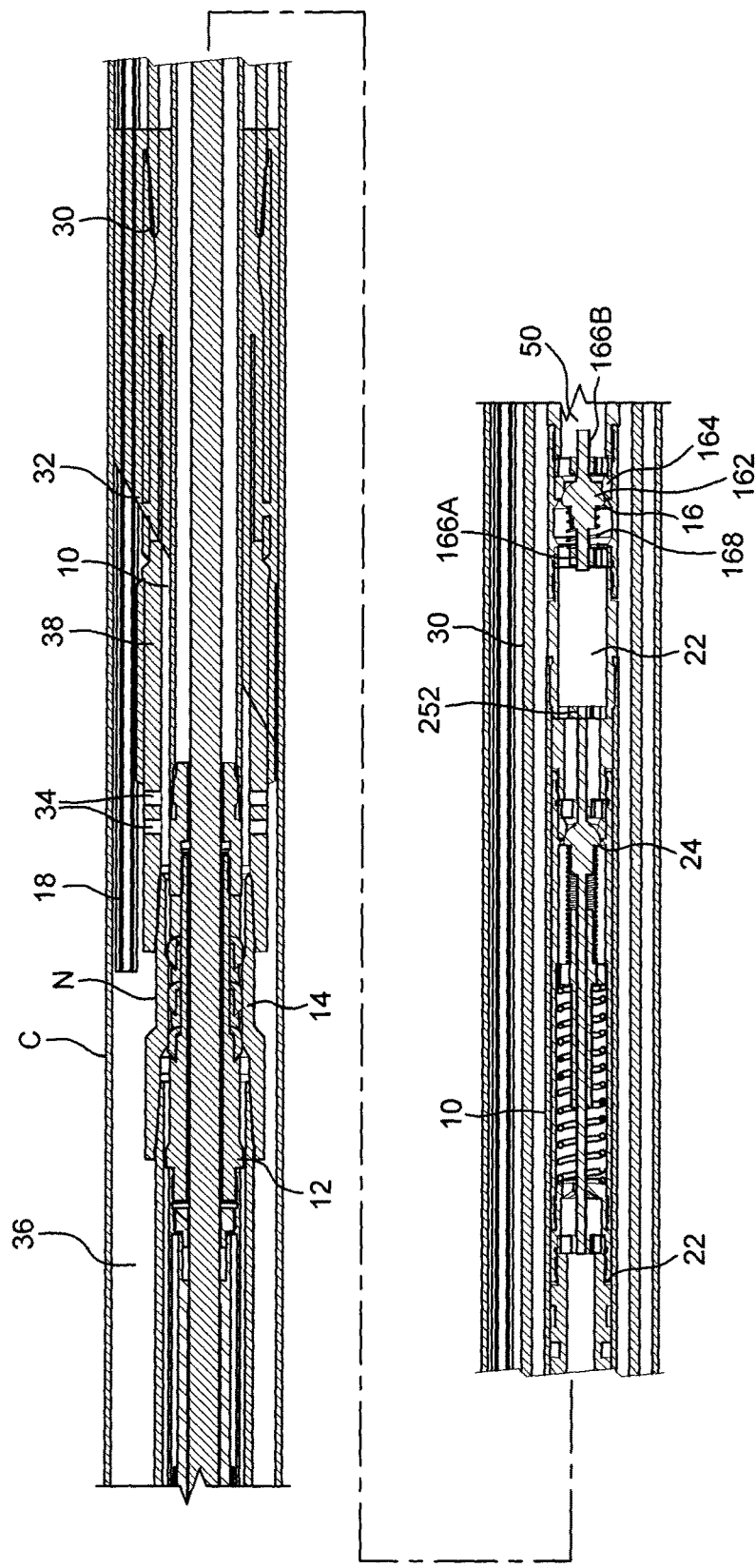

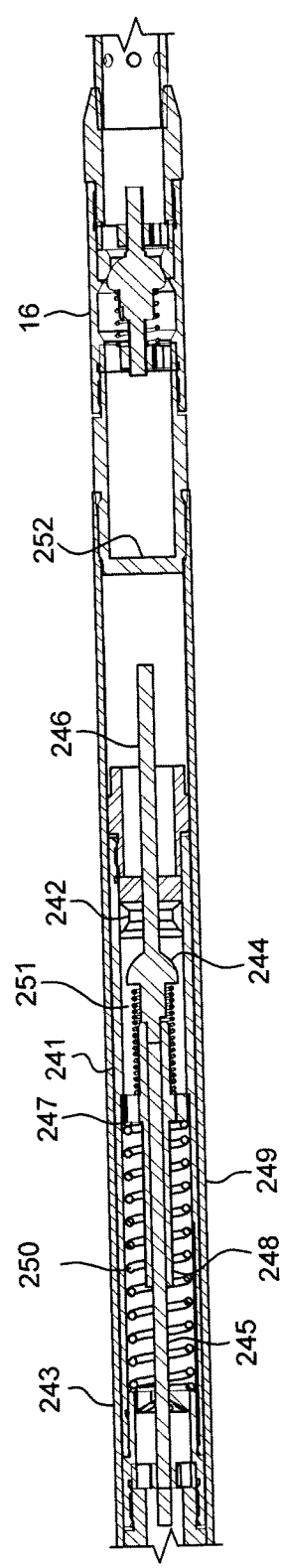
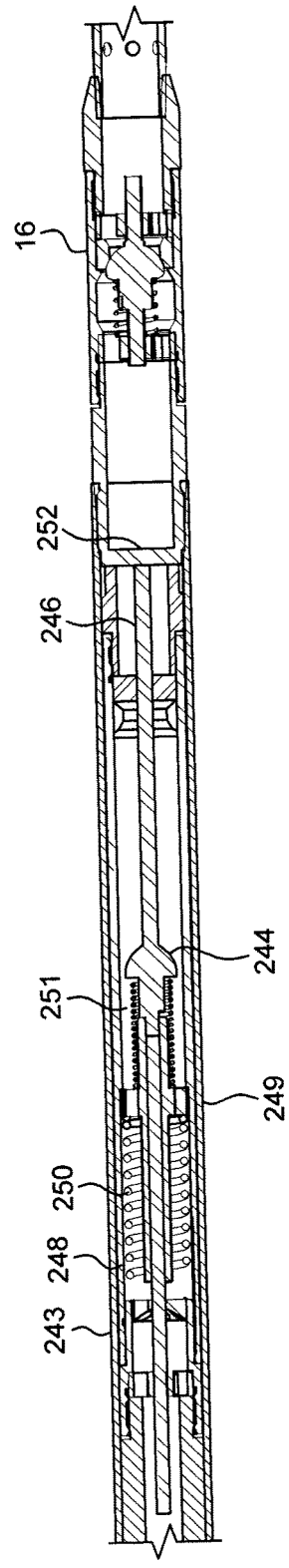

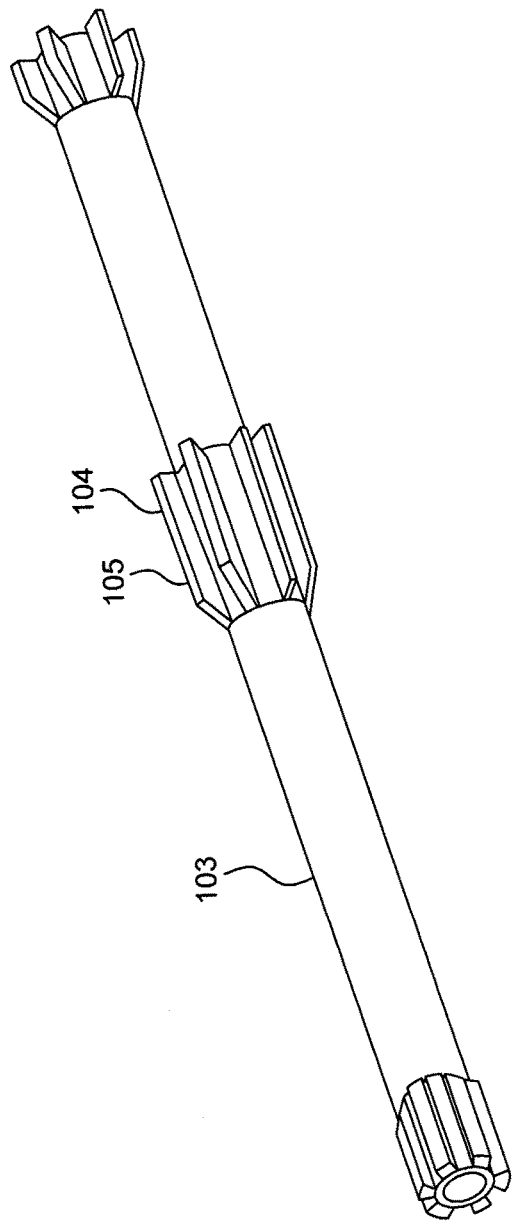
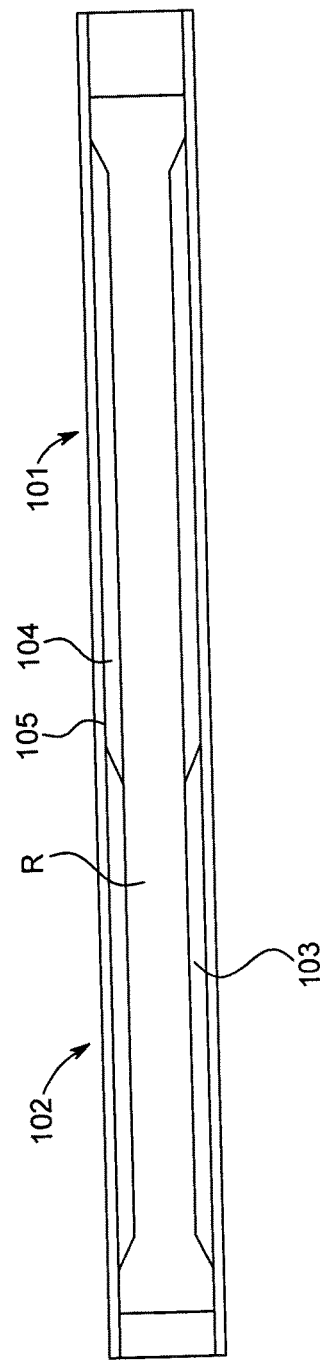
FIG. 7
FIG. 8

ROD PUMP SYSTEM

FIELD OF THE INVENTION

The present invention relates to reciprocating rod pump systems.

BACKGROUND

As petroleum reservoirs and their available reservoir pressures deplete, oil and gas wells require an artificial lift solution to efficiently produce production fluids to surface. In many cases, wells have insufficient energy upon initial completion and require artificial lifting solutions immediately after the well is put on stream.

Low pressure producing wells are highly sensitive to back pressure being applied against the formation. As such, the lifting solution is required to operate efficiently with a minimal liquid head and static gas pressure applying a small nominal back pressure against the producing zone. The low nominal required back pressure against the formation during production implies that the pumping unit must be landed as close to the producing formation as possible. The smallest vertical distance possible is ideal; however herein lies the challenge for the existing pumping devices since in order to minimize the vertical distance between the pump intake and reservoir, the pump must be landed at or near 90 degree inclination from vertical. At any inclination greater than approximately 45 degrees, existing rod pumping devices are highly inefficient.

The operation of a conventional rod pump is cyclic. When the traveling valve is positioned at the bottom of the pump barrel, immediately above the closed barrel cage, the pump is at the bottom of its downstroke. At this point, the plunger and pump barrel above the traveling valve are full with produced fluid. As the rod moves up, it carries the traveling valve upwards with it, which isolates the hydrostatic pressure above the traveling valve from the region between the traveling valve and the standing valve. The upward movement of the traveling valve creates a low pressure region between the traveling and standing valves. The reservoir pressure from below the standing valve then unseats the standing valve, and fluid from the formation enters the pump barrel through the standing valve. The fluid above the traveling valve is carried through the pump barrel and upwards towards the surface during the upward movement of the valve rod. The pump then reaches the top of its upstroke. From there, the traveling valve descends through the fluid which just entered the pump barrel, trapped between the traveling and standing valves. The fluids in the barrel unseat the traveling valve as it travels downward to permit transfer of the fluid from the pump barrel below the traveling valve to the pump barrel above the traveling valve. Finally, the traveling valve moves to the bottom of the pump barrel to complete the rod pump stroke.

The high degree of inefficiency of the rod pumping system at greater inclinations is a result of the traditional rod pump valve configurations. Conventional gravity assisted, vertically oriented rod pump systems employ a ball and seat valve configuration in which the components are matched pairs, which is accomplished by lapping of the two surfaces. Variations of this standard configuration exist including hemispherical, guided valve, and matched and lapped seats as described in U.S. Pat. No. 5,829,952. This style of valve is highly dependent on gravity to return the ball (or other valve element) to the seat and isolate the top side of the valve from the region below the valve. As a result, traditional rod pumping systems have been conventionally described as gravity assisted and requiring an orientation at or near vertical for efficient operation.

When the inclination of the rod pump is greater than about 45° from vertical, the ball may not return to the seat but instead will reside off seat lying against the wall of the closed cage in the rod pumping system. When this occurs, the valves fail to isolate the tubing hydrostatic pressure from the reservoir/wellbore pressure, and do not positively displace the fluid into the production tubing. This is often mistaken at surface as worn pump valves or plunger components, gas interference or simply taken as "normal operating" conditions for these systems. Therefore, the most frequent response to these conditions at surface is to reciprocate the rod pump at a higher frequency by speeding up the pump jack, in an effort to seat the valves using kinetic force. At best, this will moderately improve the pumping performance.

The implications of this operating strategy result not only in poor pumping efficiency, but also accelerated tubing and rod wear, higher maintenance costs for surface equipment (belts, gearboxes, drive motors, etc.), higher horsepower and fuel costs, and shorter than expected rod pump life.

If the produced fluid has increased gas-liquid ratio, which has inherently higher compressibility than liquid alone, additional complications may arise. This compressibility will often not allow sufficient pressure to build in the barrel or the rod pump during the downstroke to overcome the hydrostatic pressure in the barrel on the up-hole side of the traveling valve. This condition may lead to gas locking of the rod pump since the pressure above the standing valve has equalized with the wellbore pressure below the standing valve at the rod pump inlet. As a result the gas/liquid combination becomes trapped and the continual heat of compression resulting in this operation can damage plunger seals in the downhole rod pump. This condition can occur at any rod pump inclination but is more likely to occur at high angle deviations since it requires that the conventional valve systems are fully operational; which, again, is dependent on the magnitude of the force due to gravity.

Using standard valve sub-systems in the down-hole rod pump when there is a high gas-volume ratio at the pump inlet and/or when the pump is landed at high deviations (greater than 45°), the valve sub-systems can remain off-seat for extended time periods and thereby allowing the tubing fluid level to equalize with the wellbore/reservoir pressure. In this condition, due to the depleted state of the reservoir, the free fluid surface in the tubing string will be at a level substantially below the surface with gas migrating through and occupying the portion of the tubing string above the free fluid surface. Due to the poor efficiency of the rod pump sub-systems, continuous high rate rod string cycling can lead to excessive heat accumulation in the upper region of the tubing string and ultimate failure of the polished valve rod stuffing box seal assemblies.

As the operating envelope for the traditionally configured rod pump has been expanded, there have been numerous accessories developed to maintain pumping efficiency in these challenging and/or deviated wellbores.

One prior art solution uses a spring biased Baird style standing valve whereby the standard ball and seat valve is biased closed using a spring. This spring applies a nominal preload to the uphole side of the ball which must be overcome by the wellbore pressure acting on the bottom area of the standing valve ball. This nominal spring force on the ball assists returning the ball to the seat following activation and will not reside off-seat during operation in high deviation wellbores. In order to initiate pumping with this subsystem in place the wellbore must have a net positive suction head in the annulus which will easily overcome the biasing spring force and off-seat the standing valve. In other words, the free surface of the fluid in the annulus must accumulate high enough above the pump intake such that the resulting hydrostatic pressure will off seat the standing valve.

In another example, a Baird snubber style traveling valve is similar in concept to the spring biased standing valve as this traveling valve is also spring biased. This valve also utilizes a spring to apply a pre-load to the top side of the ball to keep the valve firmly in place on the seat and minimize the times when the valve is caught off-seat and not isolating the top from the bottom side of the valve seat. This spring biasing in theory provides more utility to the sub-system within the rod pump for usage in highly deviated applications. These valves can be subject to tens of millions of cycles in 1 year of operating life. As such, the valves must be designed with these criteria in mind to evolve a successful rod pump sub-system.

Another prior art solution comprises a simple mechanical device with a reciprocating stem which when the pump is tapped (ie. traveling valve faced out on barrel cage bushing), the stem physically impacts and unseats the ball from the seat allowing pressure to equalize across the traveling valve in order to prevent gas locking.

Sliding top valve assemblies are known which temporarily relieve the hydrostatic pressure from the uphole side of the traveling valve to allow the pressure from below the traveling valve to readily equalize with the pressure above the traveling valve. This is of particular importance when there is a gas/volume ratio large enough to prevent the traveling valve from being unseated consistently. However, the effectiveness of the sliding top valve (also known as a hydrostatic relief valve) is very low in deviated wellbores. This device typically relies on gravity (weight of sliding valve) in order to close the valve and isolate the hydrostatic pressure in the tubing above. When the rod pump system is installed at any significant deviation from vertical, the effect of gravity acting along the valve center line is small and the weight of the valve rod and plunger assembly reciprocating through the inner diameter of the valve is such that it will tend to radially displace the valve and prevent it from traveling concentrically to engage the valve seat and isolate the hydrostatic pressure above the pump.

Therefore, there is a need in the art for rod pump systems which may be able to operate efficiently in high gas content scenarios and/or highly deviated wellbores.

SUMMARY OF THE INVENTION

The claimed invention relates to a downhole rod pump system, and more particularly a rod pump system adapted for lifting liquids from low energy oil and gas reservoirs, such as depleted reservoirs. The present invention relates to a rod pump configuration having subsystems or components which may be adapted to provide efficient operation when operating with produced fluids having high gas content or in highly deviated wellbores, or both. The subsystems or components include a traveling valve assembly, a sliding top valve assembly, an oil/gas separator, or a rod bushing and pump barrel assembly, or combinations of such subsystems or components. The system may be deployed in conjunction with conventional, unconventional or enhanced oil recovery techniques, such as steam-assisted gravity drainage, miscible flood, steam (continuous or cyclic), gas or water injection.

Embodiments of the system and method of the present invention may also be used in offshore operations, including configurations where the well head is located on the sea bed.

In one aspect, the invention may comprise a rod pump system comprising a sliding top valve comprising:
(a) a cylindrical valve housing having a lateral flow port opening, and an upper equalization port;
(b) a polished valve rod extending through the housing and defining an annular space therebetween;
(c) a valve assembly comprising an annular valve seat disposed below the flow port and defining flow openings and a valve body, the valve body disposed around the polished valve rod and reciprocating between an open and closed position, wherein the valve body is spaced apart from the valve seat to allow flow through the flow port in its open position, and the valve body is seated on the valve seat in its closed position;
(d) biasing means for urging the valve body towards its closed position;
(e) at least one bearing assembly disposed within the annular space above the valve assembly, for centralizing and radially supporting the polished valve rod, the bearing assembly defining a gas equalization passage; and
(f) a concentric main seal disposed below the second bearing assembly for sealing against an upper portion of the polished valve rod, which has a larger diameter than a lower portion of the polished valve rod;
wherein when the lower portion of the polished valve rod is adjacent the main seal, the gas equalization passage is in fluid communication with production tubing above and below the sliding top valve.

In one embodiment, the sliding top valve comprises an upper bearing assembly disposed within the annular space above the valve assembly, for centralizing and radially supporting the polished valve rod, the bearing assembly defining a gas equalization passage, and a lower bearing assembly disposed within the annular space below the valve assembly for centralizing and radially supporting the polished valve rod, the second bearing assembly defining a gas equalization passage and a production fluid flow passage In another aspect, the invention may comprise a rod pump system comprising a traveling valve having a pump barrel and comprising:
(a) a plunger which reciprocates within the pump barrel and engages a cylindrical valve housing having an interior valve seat with a central opening and a stem guide bushing, the valve seat and stem guide bushing defining a cavity therebetween;
(b) a valve comprising a valve body having a face which mates with the valve seat, a valve stem which extends upwards, and a tapping stem which extends downwards through the central opening, wherein the valve body is axially moveable within the cavity;
(c) a tapping guide comprising a tubular member slidingly disposed on the valve stem and a transverse disk having an upper surface and a lower surface, and defining flow openings, wherein the tubular member extends above and below the disk;
(d) a first biasing means acting between the stem guide bushing and the tapping guide transverse disk upper surface to resist upward movement of the tapping guide relative to the valve housing; and
(e) a second biasing means acting between the lower surface of the tapping guide disk and the valve body to resist upward movement of the valve body relative to the tapping guide.

In one embodiment, the first and second biasing means may comprise coil springs.

In one embodiment, the pump barrel may comprises a cylindrical pump barrel segment and a valve rod bushing disposed within the barrel segment, the bushing configured to centralize and radially support a valve rod and comprising radially extending vanes which engage the inside diameter of the barrel segment.

In one embodiment, the rod pump system may further comprise an oil/gas separator which comprises:
(a) a cylindrical housing defining an annular space between the separator and a casing, disposed concentrically around the traveling valve separator, and having a closed lower end and at least one intake port and at least one gas port at an upper end;
(b) a centralizer for ensuring concentricity of the separator within a wellbore casing; and
(c) an isolation packer to create pressure isolation between the casing/tubing annulus above the separator and casing/tubing annulus below the separator.

In one embodiment, the oil gas separator further comprises a restrictor sleeve which narrows the annular space at an upper end of the separator.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows:

FIG. 2A is a cross-sectional view of one embodiment including an oil/gas separator and a casing restrictor.

FIG. 5 is a view of the embodiment of FIG. 4, in a hydraulically opened position.

FIG. 6 is a view of the embodiment of FIG. 4, in a tapped open position.

FIG. 7 shows one embodiment of a pump barrel bushing.

FIG. 8 shows a cross-sectional view of the bushing installed in pump barrel segments.

DETAILED DESCRIPTION OF SELECTED EMBODIMENTS

Figure 1:
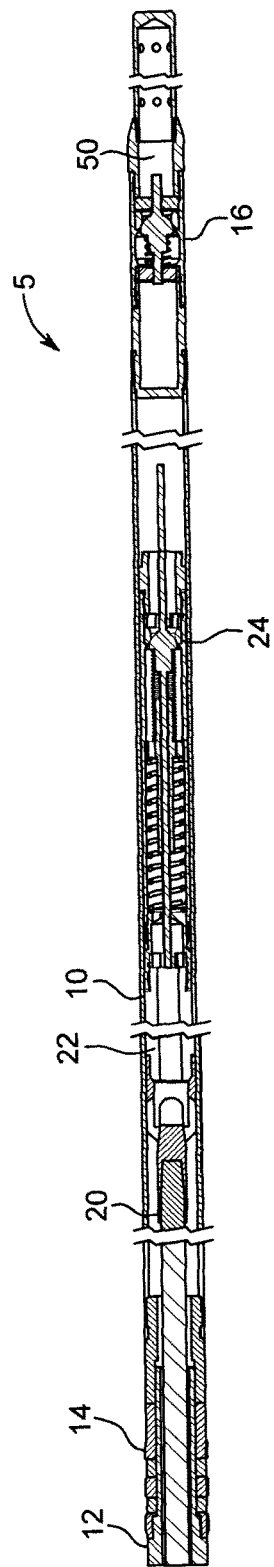
FIG. 1 shows a cross-sectional view of a rod pump assembly of the present invention.

The claimed invention described herein comprises a rod pump system which may be configured to suit many different wellbore configurations and fluid compositions. As described herein, the term "longitudinal" or "axial" refers to a direction, axis or plane parallel to the longintudinal center axis of the pump assembly. The term "transverse" or "radial" refers to a direction, axis or plane which is perpendicular to the longitudinal direction, axis or plane. The terms "up", "above", "down", or "below" (or the like) are used for convenience to refer to the relative configuration of components when the pump assembly is viewed in a vertical configuration, but is not intended to limit the use of the pump assembly vertically or at any deviated angle.

In one aspect, the invention comprises a pump assembly (5) having a cylindrical housing which comprises a pump barrel (10) disposed between a seating cup mandrel (12) and a seating cup assembly (14) at an upper end, and a standing valve (16) at a lower end. The components which reciprocate within the pump barrel (10) comprise a valve rod (20), a cylindrical plunger (22), and a traveling valve (24). As one skilled in the art will appreciate, liquids may enter the pump barrel (10) through the standing valve (16), and will enter the plunger (22) when the traveling valve (24) downstrokes towards the standing valve (16). The fluid column above the traveling valve (24) will be lifted upwards with each upstroke of the reciprocating components.

The pump assembly (5) is landed in a pump seating nipple (N) in conventional fashion, such that the seating cup assembly (14) seats within the nipple (N). In one embodiment, the pump assembly is disposed within an oil/gas separator which comprises a cylindrical separator body (30) which extends above and below the pump assembly (5). The oil/gas separator defines inlet ports (32) above the pump assembly, and gas ports (34) above the inlet ports (32). As a result, production fluids must flow around the separator body (30) and access the annular space between the pump assembly (5) and the separator body (30) through the inlet ports (32). This extended path assists in separating gases from liquids, which will flow inside the separator body down towards the pump intake, while gases are left to exit the separator (30), through gas ports (34), to the casing annular space (36).

Below the pump assembly, the production line (40) assembly comprises packer cups (42) which seal to the casing (C). The production line (40) receives production fluid flow, for example, from a horizontal or deviated portion of the wellbore. In one embodiment, the flow arrives from a horizontal portion of a wellbore, such as described in Applicant's co-pending PCT Application WO 2013/086, 623, the entire contents of which are incorporated herein by reference, for all purposes, where permitted. The flow passes through production tubing to casing port (44) and travels up the casing annulus and enters the oil gas separator (30).

Figure 2B:
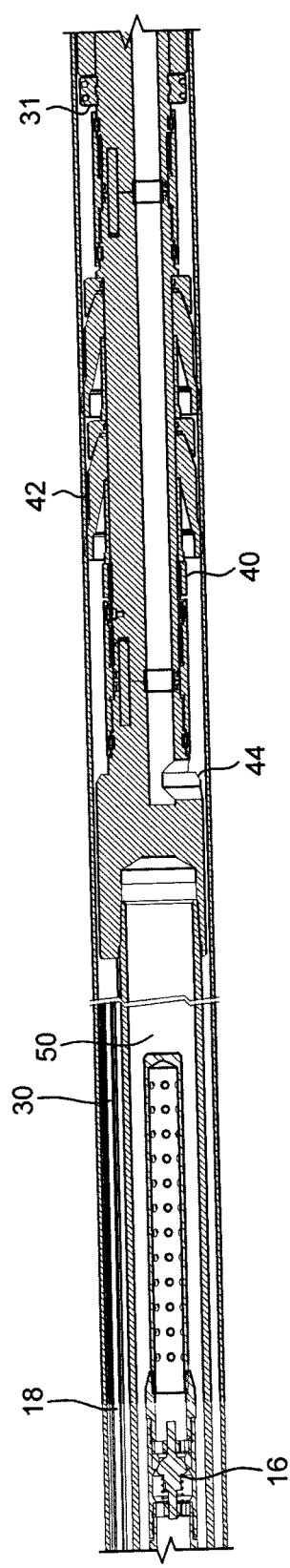
FIG. 2B shows a lower section of the embodiment of FIG. 2A.
Figure 2C:
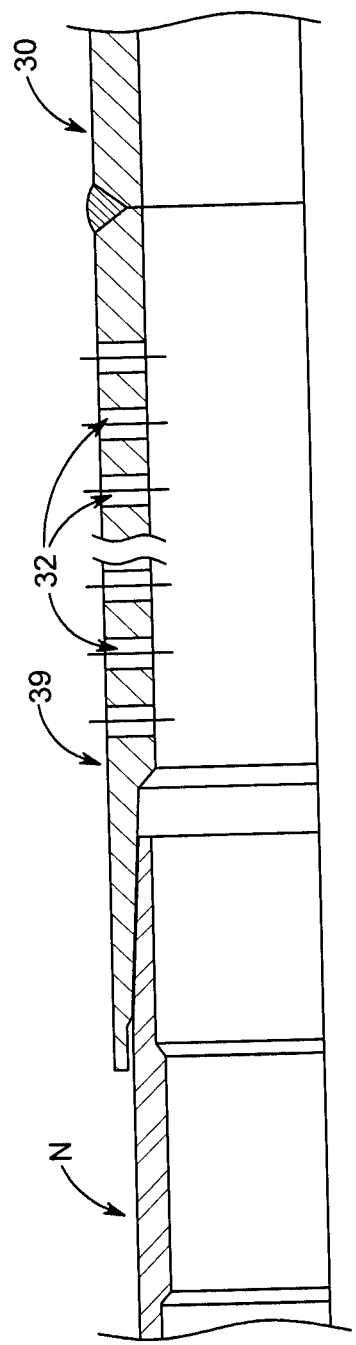
FIG. 2C shows an alternative embodiment with a perforated sleeve in place of a casing restrictor.
Figure 3:
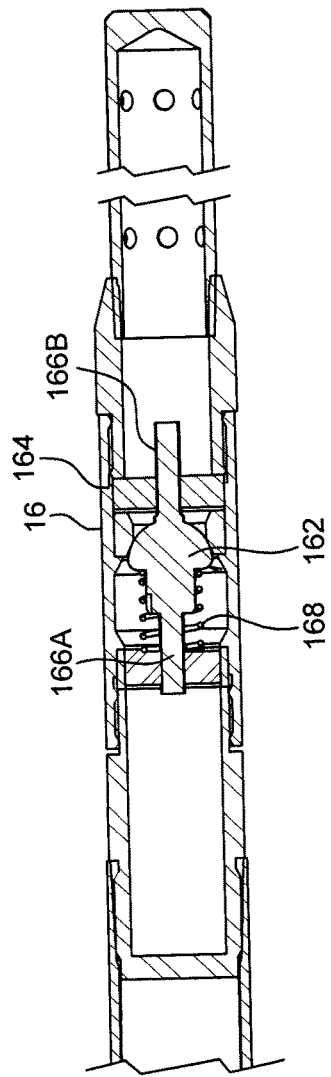
FIG. 3 is a view of a standing valve of one embodiment.

In one embodiment, depicted the oil/gas separator (30) comprises a casing restrictor sleeve (38) which narrows the casing annulus between the oil/gas separator (30) and the casing (C). This narrowing causes the fluid flow to accelerate and depressurize. As a result, gases entrained in the production oil will be encouraged to devolve and separate. In an alternative embodiment, the casing restrictor sleeve is replaced with a simple perforated tube (39) which defines a plurality of inlets (32) and which is welded to the head of the separator (30) body, as is shown in FIG. 2C.

In one embodiment, the oil/gas separator (30) comprises an external drag type centralizer (31) for ensuring concentricity of the landed assembly within the wellbore casing and is isolated within the casing to create pressure isolation between the casing/tubing annulus above the separator (30) and casing/tubing annulus below the separator. The centralizer (31) is also configured to allow passage for multiple capillary lines (18) or conductive lines, while maintaining pressure isolation from the wellbore.

Any gas which is mixed with the production flow, or which separates from the oil, continues uphole in the annulus (36). Liquids enter the separator (30) through inlet ports (32) and flow downwards in the intermediate annular space between the separator body (30) and the pump barrel (10) towards the pump inlet chamber (50). Production fluid may then pass through the standing valve (16) on the pump upstroke, and fill the pump chamber (52) between the traveling valve (24) and the standing valve (16).

In one embodiment, the standing valve (16) comprises a hemispherical valve body (162) which seats in a valve seat bowl (164). Short upper and lower valve stems (166A, 166B) are guided and centralized to ensure the valve body seats accurately on the valve seat. In one embodiment, the standing valve is biased into a closed position, for example, with a coil spring (168) on the upper valve stem (166A).

In one embodiment, the traveling valve (24) comprises:
(a) a plunger (22) which engages a cylindrical valve housing (241) having an interior valve seat (242) with a central opening and a stem guide bushing (243), wherein the valve seat (242) and stem guide bushing (243) defines a cavity therebetween;
(b) a valve comprising a valve body (244) having a face which mates with the valve seat (242), a valve stem (245) which extends upwards, and a tapping stem (246) which extends downwards through the central opening, wherein the valve body (244) reciprocates within the cavity;
(c) a tapping guide (247) comprising a tubular member (248) slidingly disposed on the valve stem (245) and a transverse disk (249) having an upper surface and a lower surface, and defining flow openings, wherein the tubular member (248) extends above and below the disk (249);
(d) a first biasing means (250) acting between the stem guide bushing (243) and the tapping guide transverse disk (249) upper surface to resist upward movement of the tapping guide (247); and
(e) a second biasing means (251) acting between the lower surface of the tapping guide disk (249) and the valve body (244) to resist upward movement of the valve body (244)

In one embodiment, the second biasing means (251) is provides less biasing force than the first biasing means (250).

Figure 4:
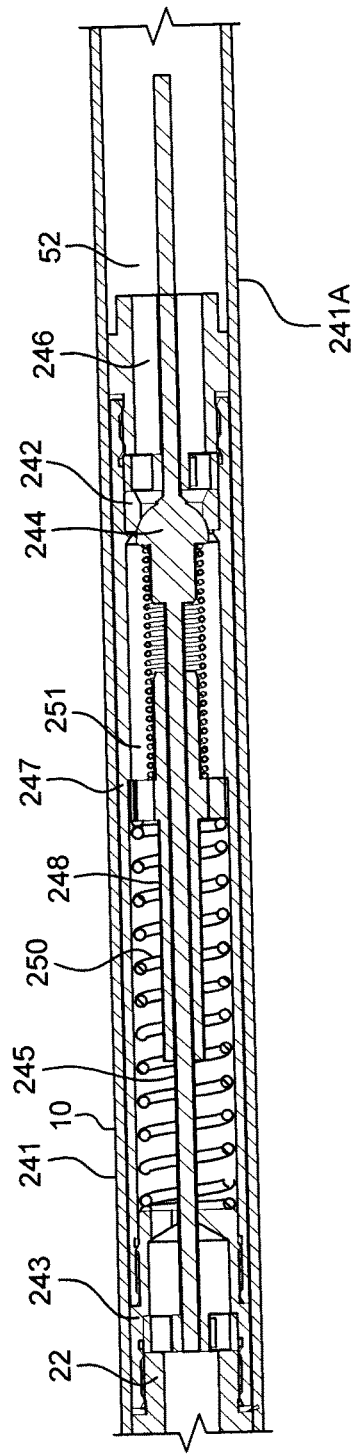
FIG. 4 is a view of a traveling valve of one embodiment, in its closed position.
Figure 9:
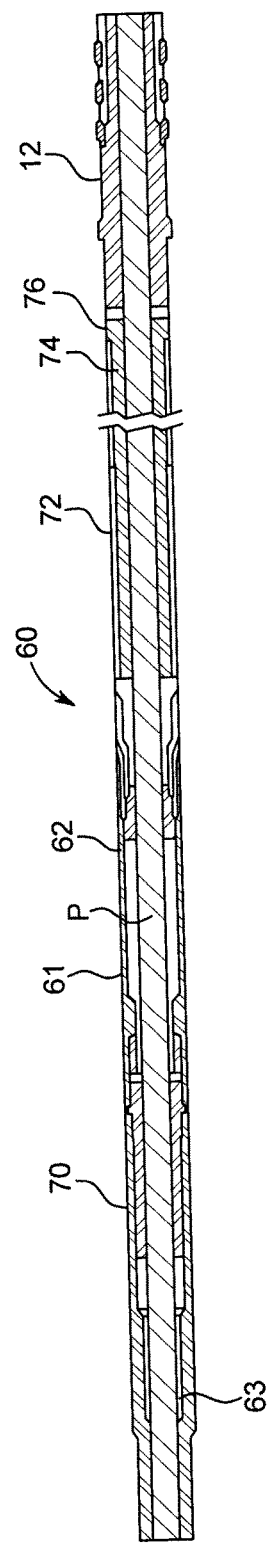
FIG. 9 shows a cross-sectional view of a sliding top valve with gas equalization of one embodiment of the present invention.
Figure 10:
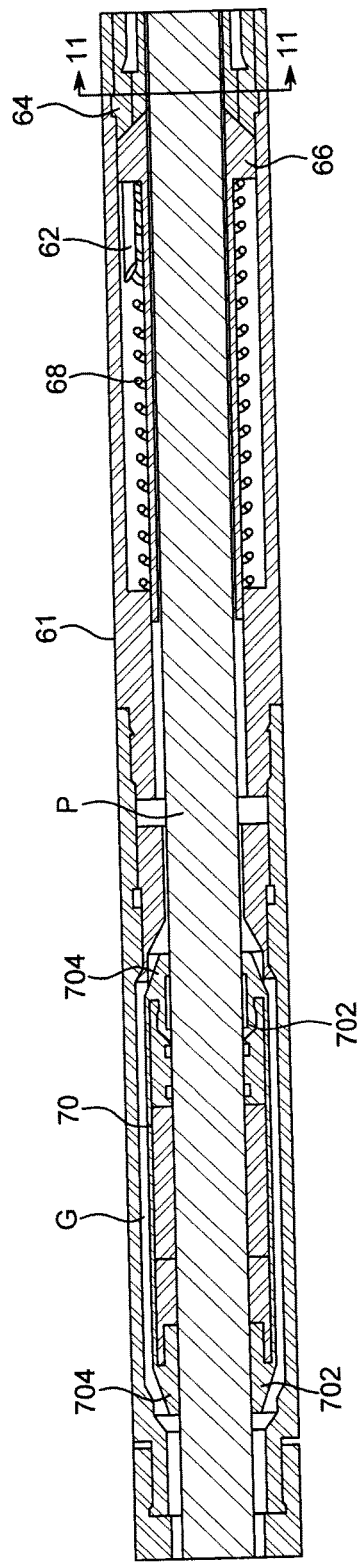
FIG. 10 shows a cross-sectional view of an upper portion of the sliding top valve of FIG. 9.
Figure 11:
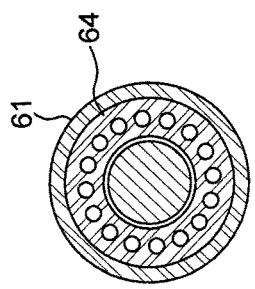
FIG. 11 shows a transverse cross-section along line XI in FIG. 10.
Figure 12:
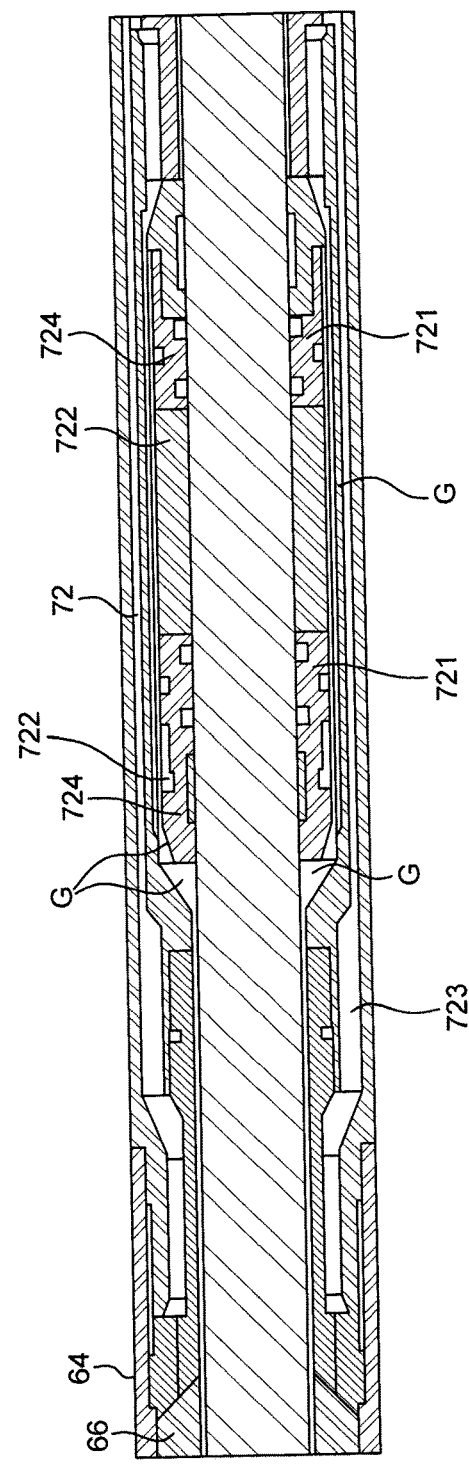
FIG. 12 shows a view of a lower portion of the sliding top valve of FIG. 9.
Figure 14:
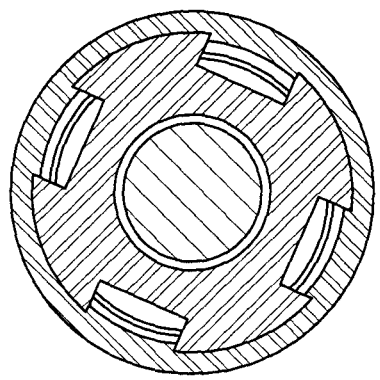
FIG. 14 is a transverse cross-section along line XIV in FIG. 13.
Figure 13:
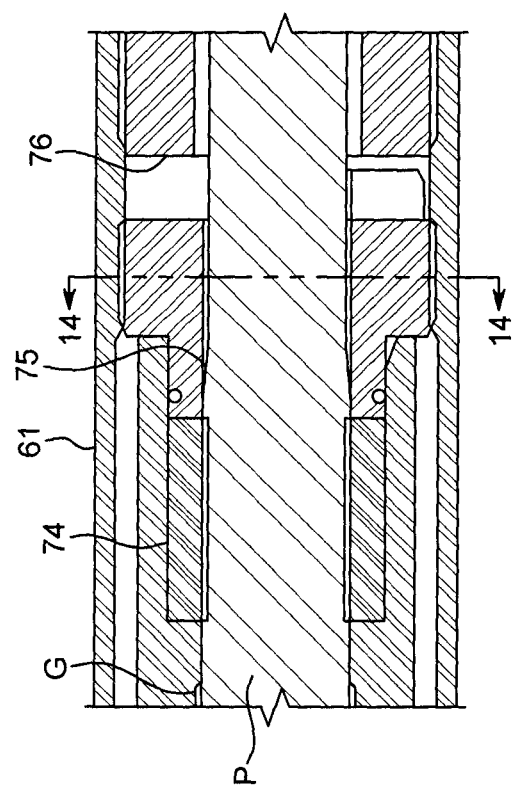
FIG. 13 shows a view of the main seal of the sliding top valve of FIG. 9 where the gas equalization pathway is closed by the main seal against the polished valve rod.
Figure 16:
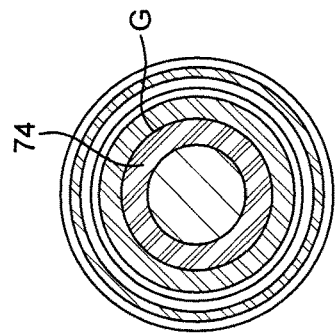
FIG. 16 is a transverse cross-section along line XVI in FIG. 15.
Figure 15:
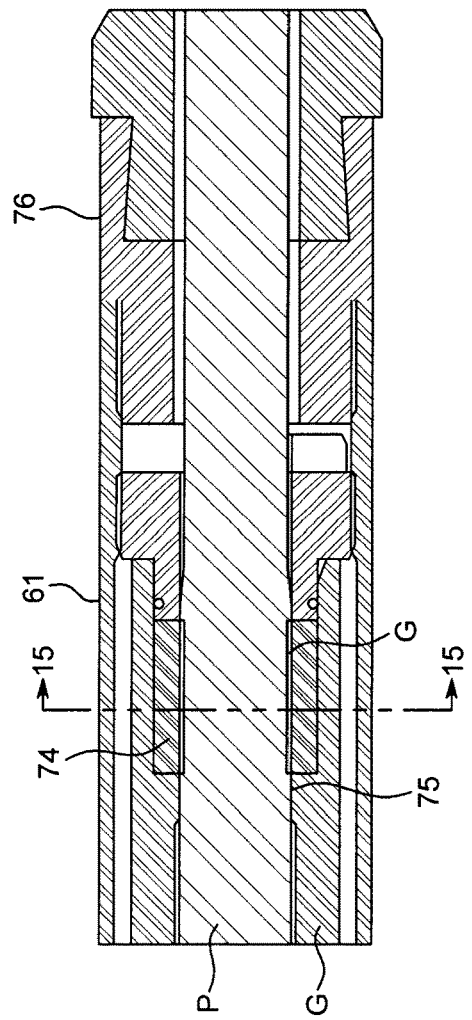
FIG. 15 is a view of the main seal where the gas equalization pathway is open by the reduced diameter portion of the polished valve rod.

In normal operation, the traveling valve opens and closes during the reciprocating cycle. During the plunger upstroke, the traveling valve is closed. It remains closed with the valve body (244) face seated on the valve seat (242), as shown in FIG. 4, through the plunger upstroke to top dead center (TDC).

When the traveling valve is closed, both the first and second biasing means (250, 251) are fully extended or minimally compressed. In this position, the tapping guide transverse disk (249) rests against an internal shoulder (241A) of the housing (241), which limits further downward motion of the tapping guide (247). As the traveling valve (24) moves downwards on a pump downstroke, the valve body (244) may be unseated if hydraulic pressure below the valve seat (242) is sufficient to compress the second biasing means (251), thereby opening the valve, as is shown in FIG. 5.

As the valve housing (241) nears bottom dead centre (BDC), the tapping stem (246) contacts the trip sub (252) positioned below the traveling valve (24), as is shown in FIG. 6. Whether or not the valve body was unseated due to fluid pressure below the traveling valve, the tapping stem (246) will maximally compress the second biasing means (251) such that the valve body (244) bears on the tapping guide tubular member (248), and then compress the first biasing means (250), as is shown in FIG. 6. On the pump upstroke, the valve housing (241) then moves upwards from BDC and the tapping stem (246) moves off the trip sub (252). The first and second biasing means (250, 251) then urge the valve body (244) towards its closed position, until the TDC position is reached, initiating a new pump cycle.

The traveling valve (24) thus has an integrated gas breaker function as the tapping stem will cause the valve to unseat even if the fluid pressure differential above and below the valve is insufficient to unseat the valve. In one embodiment, the valve body (244) is hemispherical and guided by both the valve stem (245) and the tapping stem (246).

A lower nominal pre-load force of the second biasing means (251) allows the valve to be off-seated with lower nominal pressure differentials. As a result, the possibility that gas locking occurs is reduced. The design of the traveling valve system length is such that the spring biasing in normal valve operation and the tapping function with positive valve return can be accommodated inside one sub-system assembly.

In one embodiment, the first and second biasing means (250, 251) comprise coil springs. Preferably the coil springs are chosen to have different frequencies, to prevent resonant vibrations in the system. Other springs may be used, such as gas springs or torsion springs. Alternatively, a resilient elastic material may be used to provide the biasing force.

In one embodiment, the pump system comprises a rod bushing (103), as is shown in FIG. 7. In deviated wellbore applications, the performance of the pump system is at least partly dependent on the ability of the rod pump to efficiently move produced oil through the downhole system, which is highly dependent on the concentricity of the plunger/seal assembly. In order to efficiently manage the concentricity, a sub-system of rod bushings (103) may be dispersed along the length of the pump barrel. These rod bushings (103) serve to support the weight of the valve rod within the pump barrel, when the pump system is deviated from vertical, during the entire length of the stroke. At the same time, the rod bushings (103) minimize the lateral loading on the plunger (22) and seal assembly within the pump barrel. In one embodiment, the bushings (103) define a bore through the center to receive and guide the valve rod, and comprise vanes (104) on the outside diameter having threads to engage the inside of the pump barrel (101, 102).

In one embodiment, a pump barrel (10) comprises a plurality of pump barrel segments, which may be the same or different in some respect. In one embodiment, a heavy wall pump barrel segment (101), which has an externally threaded ends alternates with a light wall pump barrel segment (102) with internal threads. The bushing (103) overlaps the threaded connection between a heavy wall segment (101) and a light wall segment (102) as shown in FIG. 8. The vanes (104) are threaded to the inside of the heavy wall barrel and comprise an upset (105) which has an effective outside diameter equal to the inside diameter of the light wall barrel, and larger than the inside diameter of the heavy wall barrel (101). The upset (105) then rests against the end of the heavy wall barrel (101). The pump barrel assemblies improve the longitudinal stiffness of the centralizer bushing (103), thereby improving the concentricity of the plunger/seal assembly. Multiple pump barrel assemblies may be used to create the desired length of the pump barrel (10), such that thin wall barrel segments alternate with heavy wall segments.

The threaded connections between the pump barrels segments, and the bushings (103) are configured to resist the torque generated by the rod rotator on surface, which conventionally will rotate the rod in a clockwise direction from surface during normal rod pumping operations.

In one embodiment, the pump system further comprises a sliding top valve assembly (60) which isolates the pump barrel pressure from the hydrostatic head of the production column during the traveling valve downstroke, to further assist in combating gas locking. The sliding top valve assembly (60) has a gas equalization function which allows gas pressure to escape and equalize. Thus configured, the sliding top valve assembly assists in relieving the hydrostatic pressure from the uphole side of the traveling valve by providing an efficient means to cycle opened and closed, even if the top valve body (66) itself does not. Efficient cycling of the top valve (60) is accomplished by isolating the reciprocating movement of the polished valve rod (P) through the sliding top valve (60) from the reciprocation of the sliding top valve body (66).

In one embodiment, the sliding top valve comprises:
(a) a cylindrical valve housing (61) having a lateral flow port opening (62), and an upper equalization port (63);
(b) a polished valve rod (P) extending through the housing (61) and defining an annular space therebetween;
(c) a valve assembly comprising an annular valve seat (64) disposed below the flow port (62) and defining flow openings and a valve body (66), the valve body (66) disposed around the polished valve rod (P) and reciprocating between an open and closed position, wherein the valve body is spaced apart from the valve seat to allow flow through the flow port in its open position, and the valve body is seated on the valve seat in its closed position;
(d) biasing means (68) for urging the valve body towards its closed position;
(e) an upper bearing assembly (70) disposed within the annular space above the valve assembly, for centralizing and radially supporting the polished valve rod (P), the upper bearing assembly defining a gas equalization passage (G);
(f) a lower bearing assembly (72) disposed within the annular space below the valve assembly for centralizing and radially supporting the polished valve rod, the lower bearing assembly defining a gas equalization passage (G) and a production fluid flow passage; and
(g) a concentric main seal (74) disposed below the second bearing assembly for sealing against an upper portion of the polished valve rod, which has a larger diameter than a lower portion of the polished valve rod. The transition (75) to the reduced diameter section is positioned such that it reciprocates adjacent to the main seal.

The sliding top valve (60) defines a production passage around top valve components, inside external closed cages and through the open valve seat as primary production passage from the pump barrel to tubing above the rod pumping system. A secondary passage between the outside diameter of the polished valve rod and top valve internal diameter provides a passage through which the tubing hydrostatic pressure equalizes when the main seal (74) is open.

Liquid production flow passes through the seal cage bushing (76) from the pump barrel (10) and enters production flow passages inside the valve housing (61). The production passage continues up around the lower bearing assembly (72), between the lower bearing assembly and the valve housing (61) and then through the valve seat (64) flow openings, if the valve is open. When the valve is open, the flow exits the valve housing (61) through lateral flow ports (62). When the valve is closed, the production fluid below the top valve (60) is isolated from the production column above the top valve. The valve body face and valve seat may be matched by lapping to ensure a tight seal. The sliding top valve opens in response to a pressure differential which overcomes the top valve biasing means (68) and the hydrostatic head of the production column. It closes automatically when the pressure differential is reversed, and the biasing means (68) ensures positive closure.

A gas equalization passageway (G), which extends the length of the sliding top valve assembly (60), opens for a portion of the pumpstroke, when the polished valve rod is at its upper end of travel. When the polished valve rod is at the top end of its travel, the reduced diameter transition (75) portion passes through the main seal (74), allowing any accumulated gas below the main seal (74) to pass into the microannulus between the polished valve rod (P) and the main seal (74). The gas equalization pathway continues through the lower bearing assembly (72), and reenters the microannulus surrounding the polished valve rod as it passes through the valve seat (64) and valve body (66). The gas equalization pathway then passes around the upper bearing assembly (70), and again reenters the microannulus surrounding the polished valve rod above the upper bearing assembly, and finally opens up to the production tubing through port (63).

The main seal (74) seals around the polished valve rod (P) for a majority of the pumpstroke which seals off the gas equalization pathway (G). When the sliding top valve (66) is seated against the valve seat (64), the hydrostatic pressure in the production tubing above the lateral flow ports (62) is isolated from the pump barrel. On the upstroke, the sliding valve opens as a result of increased pressure in the pump barrel, permitting flow of production liquids through the lateral flow ports (62) into the production tubing. When the polished valve rod nears the top of the upstroke, the sliding valve closes, however, the polished valve rod transition (75) taper passes through the main seal (74), thereby momentarily opening the gas equalization passage (G) between the polished valve rod (P) and the main seal (74). At this point, if gas pressure has built up within the pump barrel, it may escape through the gas equalization passageway and equalize with hydrostatic pressure in the production tubing.

As the polished valve rod reverses direction and begins its descent, it re-engages the main seal (74) and closes off the gas equalization pathway, and the sliding valve body (66) seats, again isolating the production column hydrostatic pressure. This creates a low pressure region on the uphole side of the traveling valve and allows it to easily be off-seated and transfer fluid and gas through the traveling valve to the pump barrel above during the plunger downstroke.

The upper and lower bearing assemblies (70, 72) provide two functions: to reduce sliding friction of the polished valve rod (P) while supporting the lateral loading due to the weight of the polished valve rod, and to properly centralize the polished valve rod inside the top valve assembly (60). This duality of function also effectively isolates the reciprocation of the polished valve rod (P) from that of the sliding top valve body (66). The lower bearing assembly (72) is equipped with seals (721) adjacent the bearings (722) and a bypass passage (723) for fluid production from the pump barrel to move past the bearings. The polished valve rod has polished sealing surfaces in the area of the seals (721) and centralization of the polished valve rod is accomplished by the wear rings (724) flanking the seal assemblies. The gas equalization pathway (G) passes around the bearings (722).

The upper bearing assembly similarly comprises seals (701), bearings (702), wear rings (704), and a gas equalization pathway (G) which passes around the bearings (702), however, the upper bearing assembly (70) does not require production fluid passages.

In one aspect of the invention, the assemblies and subsystems described herein may be configured in alternative systems to allow for efficient management of the fluid (gas volume ratio) at the inlet to the rod pump. At least two different configurations and methods can be selected. Selection of a preferred method is highly dependent on the expected inclination of the system when landed on setting depth and/or the expected gas content of the fluid. In one example, where the rod pump is expected to be landed in a highly deviated section, the sliding top valve (60) may be desirable as it does not rely on gravity to function properly, and an oil/gas separator (30) may be less desirable because it relies at least partly on gravitational separation. In another example, where the rod pump is expected to be landed in a more vertical orientation, permitting gravitational separation of gas, the oil/gas separator may be desirable, and the sliding top valve (60) may not be required.

In one example, a rod pump system equipped to move gas in a highly deviated rod pump depth beyond build section and at the heel of the well, may comprise a total pump barrel length at approximately 7.5-m (24.6 ft) and the following components (from top to bottom):
1. Valve rod bushing
2. Polished valve rod with sliding top valve taper
3. Valve rod guide
4. Sliding top valve
5. Seal mandrel and seating cups
6. Heavy wall pump barrel segment
7. Rod bushing
8. Thin wall pump barrel segment
9. Plunger & seal assembly
10. Traveling valve
11. Trip sub & standing valve In another example, a rod pump landed at the top or near the top of the build section and therefore lower nominal inclination, may include an oil/gas separator configured to remove most of the intake gas and pump any remaining gas. The system may comprise a total pump barrel length at approximately 10-m (32.8 ft) and the following components:
1. Valve rod bushing
2. Polished valve rod
3. Valve rod guide
4. Seal mandrel and seating cups
5. Thin wall pump barrel segment
6. Rod bushing
7. Heavy wall pump barrel segment
8. Rod bushing
9. Thin wall pump barrel segment
10. Plunger & seal assembly
11. Traveling valve
12. Trip sub & standing valve
13. Downhole oil/gas separator The increased length of the pump barrel in this example may accommodate the length of the oil/gas separator.

Although it is not specifically described in these examples, it may be necessary, desirable or convenient in some instances to include both an oil/gas separator and a sliding top valve assembly.

Definitions and Interpretation

The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. Embodiments were chosen and described in order to best explain the principles of the invention and the practical application, and to enable others of ordinary skill in the art to understand the invention for various embodiments with various modifications as are suited to the particular use contemplated.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to combine, affect or connect such aspect, feature, structure, or characteristic with other embodiments, whether or not such connection or combination is explicitly described. In other words, any element or feature may be combined with any other element or feature in different embodiments, unless there is an obvious or inherent incompatibility between the two, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. As will be understoOd by one skilled in the art, all language such as "up to", "at least", "greater than", "less than", "more than", "or more", and the like, include the number recited and such terms refer to ranges that can be subsequently broken down into any sub-range which falls within the broader range. In the same manner, all ratios recited herein also include all sub-ratios falling within the broader ratio.

What is claimed is:

1. A rod pump system comprising a traveling valve having a pump barrel and comprising:
   (a) a reciprocating plunger which engages a cylindrical valve housing having an interior valve seat with a central opening and a stem guide bushing, the valve seat and stem guide bushing defining a cavity therebetween;
   (b) a valve comprising a valve body having a face which mates with the valve seat, a valve stem which extends upwards, and a tapping stem which extends downwards through the central opening, wherein the valve body is axially moveable within the cavity;
   (c) a tapping guide comprising a tubular member slidingly disposed on the valve stem and a transverse disk having an upper surface and a lower surface, and defining flow openings, wherein the tubular member extends above and below the disk;
   (d) a first biasing means acting between the stem guide bushing and the tapping guide transverse disk upper surface to resist upward movement of the tapping guide relative to the valve housing; and
   (e) a second biasing means acting between the lower surface of the tapping guide disk and the valve body to resist upward movement of the valve body relative to the tapping guide.

2. The system of claim 1 wherein the first and second biasing means comprise coil springs.

3. The system of claim 1 wherein the second biasing means is weaker than the first biasing means.

4. The system of claim 1 further wherein the pump barrel comprises a cylindrical pump barrel segment and a valve rod bushing disposed within the barrel segment, the bushing configured to centralize and radially support a valve rod and comprising radially extending vanes which engage the inside diameter of the barrel segment.

5. The system of claim 4 wherein the vanes comprise external threads which engage internal thread formed inside the barrel segment.

6. The system of claim 5 comprising a plurality of barrel segments attached end to end and plurality of bushings disposed therein, wherein each bushing overlaps the end-to-end connection between segments.

7. The system of claim 6 wherein the barrel segments comprise heavy wall segments and light wall segments, which alternate end-to-end.

8. The system of claim 1 further comprising an oil/gas separator which comprises:
   (a) a cylindrical housing defining an annular space between the separator and a casing, disposed concentrically around the traveling valve separator, and having a closed lower end and at least one intake port and at least one gas port at an upper end;
   (b) a centralizer for ensuring concentricity of the separator within a wellbore casing; and
   (c) an isolation packer to create pressure isolation between the casing/tubing annulus above the separator and casing/tubing annulus below the separator.

9. The system of claim 8 wherein the oil gas separator further comprises a restrictor sleeve which narrows the annular space at an upper end of the separator.

10. The system of claim 1 further comprising a sliding top valve comprising:
    (a) a cylindrical valve housing having a lateral flow port opening, and an upper equalization port;
    (b) a polished valve rod extending through the housing and defining an annular space therebetween;
    (c) a valve assembly comprising an annular valve seat disposed below the flow port and defining flow openings and a valve body, the valve body disposed around the polished valve rod and reciprocating between an open and closed position, wherein the valve body is spaced apart from the valve seat to allow flow through the flow port in its open position, and the valve body is seated on the valve seat in its closed position;
    (d) biasing means for urging the valve body towards its closed position;
    (e) at least one bearing assembly disposed within the annular space above the valve assembly, for centralizing and radially supporting the polished valve rod, the bearing assembly defining a gas equalization passage; and
    (f) a concentric main seal disposed below the second bearing assembly for sealing against an upper portion of the polished valve rod, which has a larger diameter than a lower portion of the polished valve rod;
    wherein when the lower portion of the polished valve rod is adjacent the main seal, the gas equalization passage is in fluid communication with production tubing above and below the sliding top valve.

11. The system of claim 10 wherein the sliding top valve comprises an upper bearing assembly disposed within the annular space above the valve assembly, for centralizing and radially supporting the polished valve rod, the bearing assembly defining a gas equalization passage, and a lower bearing assembly disposed within the annular space below the valve assembly for centralizing and radially supporting the polished valve rod, the second bearing assembly defining a gas equalization passage and a production fluid flow passage.

12. The system of claim 10 configured such that valve body reciprocation is isolated from polished valve rod reciprocation.

13. The system of claim 1 further comprising a standing valve disposed at a lower end of the pump barrel.

14. The system of claim 13, wherein the standing valve comprises:
    (a) a standing valve seat;
    (b) a standing valve body that mates with the standing valve seat; and
    (c) a standing valve spring that acts on the standing valve body to bias the standing valve body in mating relationship with the valve seat.

* * * * *